Jan. 19, 1965     N. A. VON RUDEN ETAL     3,165,978
FLUID PRESSURE OPERATED RECIPROCATORY MOTOR
Filed Nov. 15, 1962                                  2 Sheets-Sheet 1
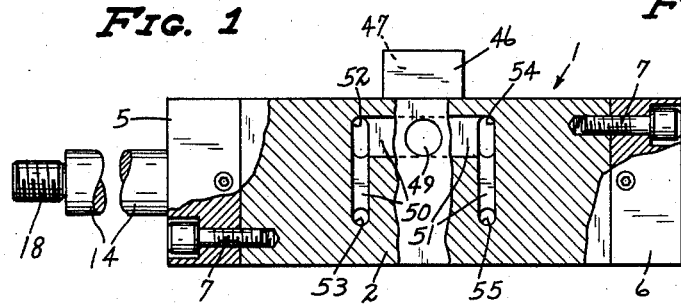
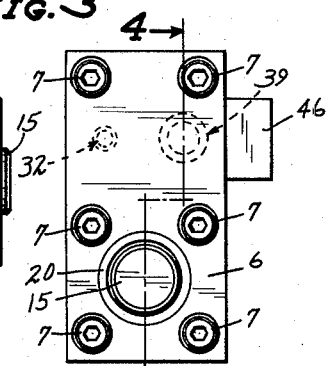
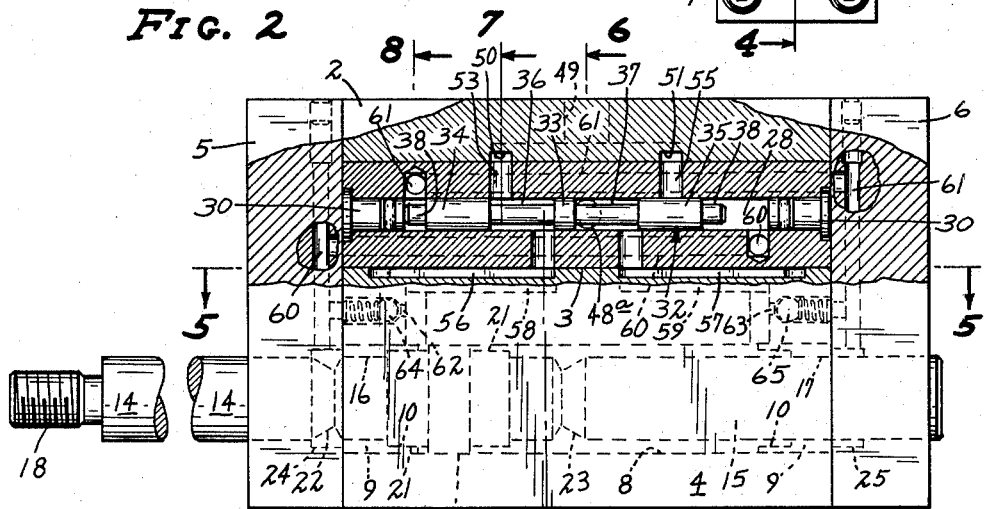
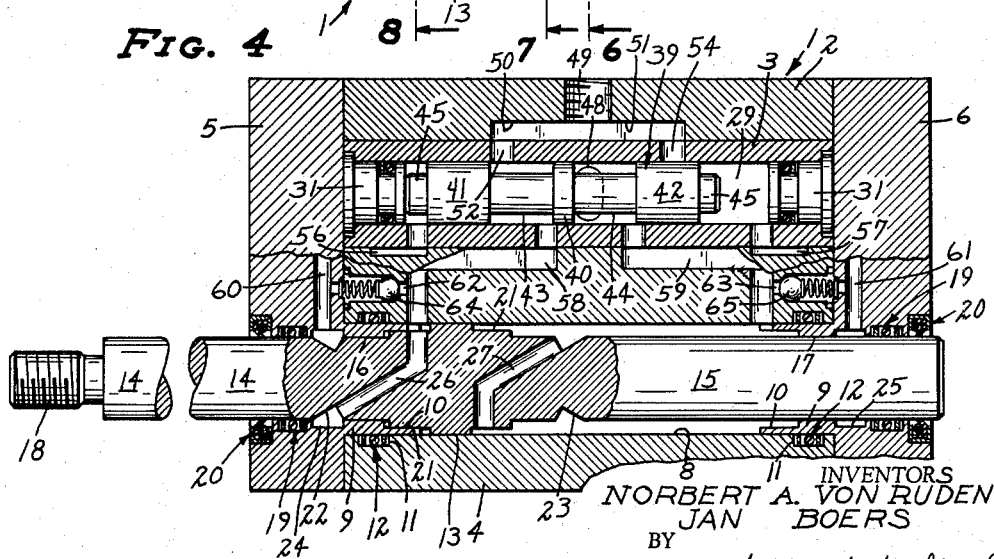
INVENTORS
NORBERT A. VON RUDEN
JAN BOERS
BY
ATTORNEYS

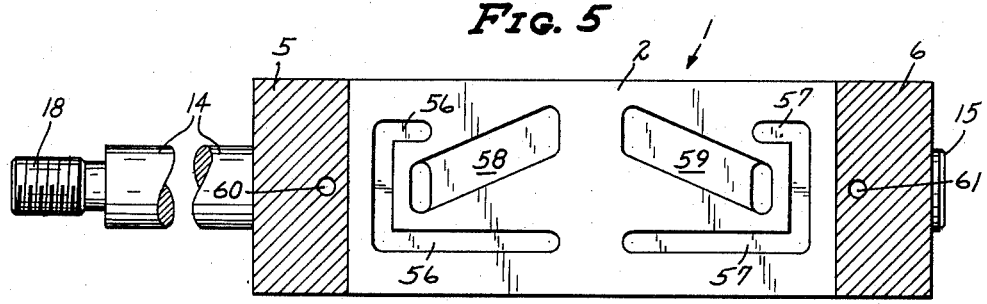
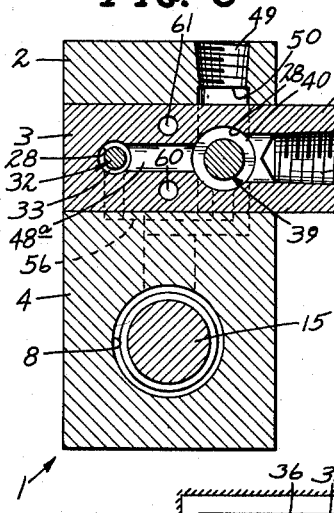
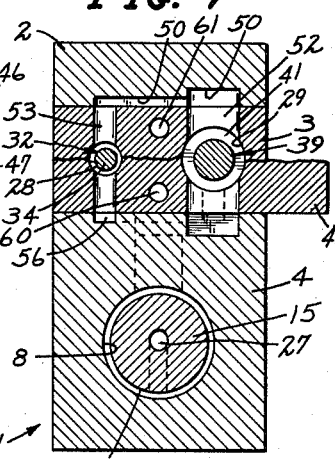
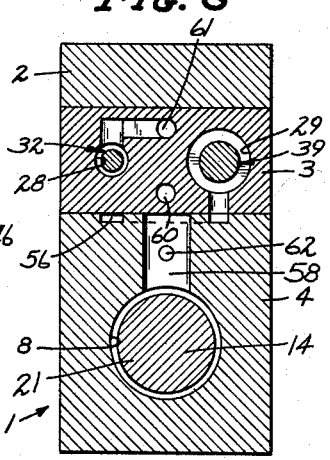
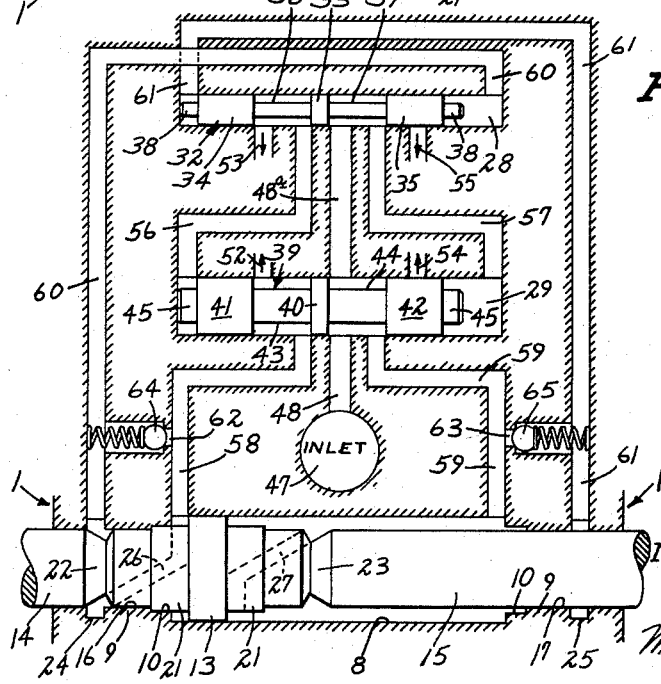
INVENTORS
NORBERT A. VON RUDEN
JAN BOERS
ATTORNEYS

United States Patent Office 3,165,978
Patented Jan. 19, 1965

3,165,978
FLUID PRESSURE OPERATED RECIPROCATORY MOTOR
Norbert A. Von Ruden, Claremont, and Jan Boers, Owatonna, Minn., assignors to Von Ruden Mfg. Co., Claremont, Minn., a corporation of Minnesota
Filed Nov. 15, 1962, Ser. No. 237,798
4 Claims. (Cl. 91—291)

Our invention relates generally to fluid pressure operated motors, and more particularly to improvements in means for automatically reversing the direction of movement of a reciprocatory element of a fluid pressure operated motor.

An important object of our invention is the provision of a motor and valve mechanism by means of which reciprocatory movement is imparted to an output member at high speeds.

Another object of our invention is the provision of a motor, as set forth, and valve means therefor which occupies a relatively small amount of space and which utilizes a minimum of moving parts.

Still another object of our invention is the provision of a reciprocatory motor and reversing valve mechanism which, when operation thereof is stopped at any position of the reciprocatory elements thereof, will automatically start when fluid under pressure is re-introduced to the motor.

Another object of our invention is the provision of a fluid pressure operated motor, as set forth, which is relatively simple and inexpensive to produce, which is highly efficient in operation, and which is rugged in construction and durable in use.

The above, and still further highly important objects and advantages of our invention will become apparent from the following detailed specification, appended claims and attached drawings.

Referring to the drawings, which illustrate the invention, and in which like reference characters indicate like parts throughout the several views:

FIG. 1 is a view in top plan of a fluid pressure operated reciprocatory motor produced in accordance with our invention, some parts being broken away and some parts being shown in section;

FIG. 2 is an enlarged view in front elevation, some parts being broken away and some parts being shown in section;

FIG. 3 is a view in end elevation, as seen from the right with respect to FIG. 2, on a reduced scale;

FIG. 4 is a longitudinal section taken on the irregular line 4—4 of FIG. 3, some parts being broken away;

FIG. 5 is a horizontal section taken on the line 5—5 of FIG. 2;

FIGS. 6, 7 and 8 are transverse sections taken on the line 6—6, 7—7 and 8—8 respectively of FIG. 2; and FIG. 9 is a diagram showing the fluid circuit of our invention.

In the preferred embodiment of out invention illustrated, the numeral 1 indicates, in its entirety, a generally rectangular body comprising an upper body section 2, an intermediate body section 3, a lower body section 4, and end sections 5 and 6. The body sections 2–4 are disposed in face-to-face superposed engagement and anchored thusly by machine screws or the like 7 which rigidly secure the end sections 5 and 6 to opposite ends of the body sections 2–4.

The lower body section 4 is longitudinally bored to provide a power cylinder 8, the end walls of which are defined by bosses 9 that are preferably integrally formed with respective ones of the end sections 5 and 6, and which are counterbored, as indicated at 10. Adjacent its opposite ends, the cylinder 8 is formed with inwardly opening channels 11 for reception of conventional sealing elements, indicated generally at 12, to prevent leakage of fluid from the power cylinder 8 past the bosses 9.

A power piston 13 is mounted for axial reciprocatory movement in the power cylinder 8, and has integrally formed therewith a pair of piston rods 14 and 15 that extend slidably through axially aligned bores 16 and 17 in the end wall sections 5 and 6 respectively, the bores 16 and 17, counterbores 10, and power cylinder 8 being coaxial. In the embodiment of the invention illustrated, the free end of the piston rod 14 is formed to provide a screw threaded portion 18 for connection to a device to be driven, not shown. Like the power cylinder 8, the bores 16 and 17 of the end sections 5 and 6 respectively are circumferentially channeled for reception of conventional sealing elements 19 and 20 of the type usually employed in connection with fluid pressure cylinders and cooperating pistons. The opposite ends of the piston 13 are diametrically reduced to provide piston portions 21 that are of a diameter to loosely fit in the counterbored portions 10 of the bosses 9, the fluid entrapped therein during reciprocatory movement of the piston 13 serving as a cushion for the piston 13 at opposite ends of said reciprocatory movement. As shown, the piston rod portions 14 and 15 are formed with circumferential channels 22 and 23 that register with cooperating annular channels 24 and 25 in the end body sections 5 and 6 respectively when the piston 13 is disposed at its extreme limit of movement in opposite directions, the piston 13 having passages 26 and 27 which communicate with the interior of the cylinder 8 and with respective ones of the channels 22 and 23.

The intermediate body section 3 is bored to provide laterally spaced parallel pilot and reversing cylinders 28 and 29 respectively that are disposed in spaced parallel relationship to the cylinder 8, the opposite ends of the pilot cylinder 28 being defined by sealing ring equipped plugs or the like 30, the opposite ends of the reversing cylinder 29 being similarly defined by sealing ring equipped plugs 31. An elongated spool-like pilot valve 32 is axially slidably mounted in the pilot cylinder 28, and is formed to provide a central valve piston 33 of relatively short axial length and a pair of cooperating valve pistons 34 and 35 of relatively long axial length adjacent opposite ends of the valve 32. The valve pistons 34 and 35 cooperate with the central valve piston 33 to define opposite ends of axially spaced circumferential grooves 36 and 37 respectively, the axial length of the grooves 36 and 37 being substantially equal to the axial length of each of the valve pistons 34 and 35. At its opposite ends, the pilot valve 32 is formed to provide axial stems 38 that engage adjacent ones of the plugs 30 to limit axial movements of the valve 32 in opposite directions.

A reversing valve 39, similar to the pilot valve 32, is mounted in the cylinder 29 for axial movements therein, and comprises a central valve piston 40 of relatively short axial length and a pair of cooperating valve pistons 41 and 42 adjacent opposite ends of the valve 39 and of relatively long axial length. The valve pistons 41 and 42 cooperate with the central valve piston 40 to define circumferential channels 43 and 44 each having an axial length substantially equal to that each of the valve pistons 41 and 42. The reversing valve 39 is provided at its opposite ends with axial stems 45 that are adapted to engage adjacent ones of the plugs 31 to limit axial movements of the valve 39 in opposite directions.

The intermediate body section 3 is formed with a boss 46 that defines an inlet port 47 which is adapted to be connected to a suitable source of hydraulic fluid under pressure, not shown, and which communicates with the central portions of the pilot and reversing valve cylinders by means of an inlet passage 48 and a continuation thereof 48a. As shown, the inlet passage 48 is cross-sectionally elongated in the direction transversely of the axis of the reversing valve cylinder 29, and preferably, has a width slightly greater than the axial length of the valve piston 40, for a purpose which will hereinafter become apparent. The inlet passage extension 48a also preferably has a diameter slightly greater than the axial length of the reversing valve piston 40. The body section 2 is provided with an outlet port 49, that is adapted to be connected to the source of liquid supply, not shown, for delivery of hydraulic fluid thereto; and is formed to provide outlet passages 50 and 51, the former of which registers with passage extensions 52 and 53 which lead to the reversing and pilot cylinders respectively in axially spaced relation to the inlet passage 48 and inlet passage extension 48a respectively. The outlet passage 51 registers with outlet passage extensions 54 and 55 in the intermediate body section 3 which passage extensions 54 and 55 lead to the reversing and pilot cylinders 29 and 28 respectively and in axially spaced relation to the inlet passage 48 and passage extension 48a respectively toward the opposite end of their respective valve cylinders from the passage extensions 52 and 53, see FIGS. 2 and 4.

The body sections 3 and 4 cooperate to define a pair of control passages 56 and 57, the passage 56 extending from the pilot cylinder 28 between the inlet passage extension 48a and the outlet passage extension 53 to one end of the reversing valve cylinder 29. The control passage 57 extends from the pilot cylinder 28 between the inlet passage extension 48a and the outlet passage extension 55 to the opposite end of the reversing valve cylinder 29. In like manner, a pair of transfer passages 58 and 59, defined by the body sections 3 and 4 extend from the reversing valve cylinder 29 to the power cylinder 8, the transfer passages 58 extending from the reversing valve cylinder 29 at a point axially intermediate the inlet passage 48 and outlet passage extension 52 to one end of the power cylinder 8. The transfer passage 59 extends from the reversing valve cylinder 29 at a point axially intermediate the inlet passage 48 and outlet passage extension 54 to the opposite end of the power cylinder 8.

The end sections 5 and 6 cooperate with the intermediate body section 3 to define fluid passages 60–61, the former of which extends from the channel 24 to one end of the pilot valve cylinder 28, the fluid passage 61 extending from the channel 25 to the opposite end of the pilot cylinder 28. The end sections 5 and 6 further cooperate with the lower body section 4 to define shunt passages 62 and 63 having spring closed ball check valves 64 and 65 respectively therein. The shunt passage 62 effects communication between the transfer passage 58 and fluid passage 60 and the shunt passage 63 effects communication between the transfer passage 59 and the fluid passage 61, see FIGS. 4 and 9.

The check valves 64 and 65 are constructed and arranged to open whenever pressure in their respective transfer passages 58 and 59 exceeds the pressure in their respective fluid passages 60 and 61. Assuming that the motor is coupled to a source of pressure, and that the power piston 13, the pilot valve 32 and reversing valve 39 are positioned as shown, fluid presure at the right hand end of the power cylinder 8, with respect to FIGS. 2, 4 and 9, will cause the check valve 65 to be opened. Pressure fluid then flows inwardly through the inlet port 47, passage 48, channel 44, transfer passage 59, shunt passage 63 and fluid passage 61 to move the pilot valve 32 to the right hand end of the pilot cylinder 28. During this movement of the pilot valve 32, fluid flows outwardly from the right hand end of the pilot cylinder 28 through the passage 60, channel 24, passages 26 and 58, channel 43, and passages 52 and 50 to the outlet port 49. Immediately upon movement of the pilot valve 32 to the right hand end of pilot cylinder 28, fluid under pressure will flow from the inlet port 47 through the passage 48 and passage extension 48a, channel 36 and passage 56 to move the reversing valve 39 to the right hand end of the reversing cylinder 29. During this movement, fluid flows from the right hand end of the reversing valve cylinder 29, through the control passage 57, channel 37 and passages 55 and 51 to the outlet port 49. This movement of the reversing valve 39 to the right moves the valve piston 40 across the inlet passage 48 and permits passage of fluid from the inlet port 47 through the inlet passage 48, channel 43 and transfer passage 58 to cause the power piston 13 to be moved in a direction from the left to the right with respect to FIGS. 2, 4 and 9. It will be readily appreciated that, the width and diameter respectively of the inlet passage 48 and passage extension 48a, being slightly greater than the axial length of the reversing valve piston 40, there will be no interruption in the movement of the reversing valve 39 from one end of the reversing valve cylinder 29 to the other end thereof. As soon as the piston 13 reaches its limit of movement in a right hand direction, pressure at the left hand end of the power cylinder 8 will cause the check valve 64 to open to admit fluid through the passage 60 to the right hand end of the pilot valve cylinder 28 to cause movement to be imparted to the pilot valve 32 toward the left. During this movement of the pilot valve 32, fluid flows from the left-hand end of the pilot cylinder 28 through the fluid passage 61, channel 25, the passages 27 and 59, channel 44 and passages 54 and 51 to the outlet 49. Immediately upon movement of the pilot valve 32 to the left hand end of the pilot valve cylinder 28, fluid under pressure is introduced to the right hand end of the reversing valve cylinder 29 to impart movement to the reversing valve 39 to the left, fluid flowing from the inlet portion 47 through the inlet passage 48 and passage extension 48a, channel 37 and control passage 57. During this movement, fluid flows from the left hand end of the reversing valve cylinder 29 through the control passage 56, channel 36 and passages 53 and 50 to the outlet port 49. As soon as the reversing valve 39 is moved to the left hand end of the reversing valve cylinder 29, fluid flows from the inlet port 47 through the inlet passage 48, channel 44, and transfer passage 59 to the right hand end of the cylinder 8 to impart movement to the power piston 13 toward the left, thus completing a cycle of operation which is repeated as long as fluid under pressure is supplied to the inlet port 47.

It will be appreciated that, during initial movement of the power piston 13 from one end of the power cylinder 8 toward the other thereof, fluid pressure is increased in the adjacent fluid passage 60 or 61 to tend to impart reversing movement to the pilot valve 32. However, it will be noted that the opposite fluid passage 60 or 61 is closed by its respective check valve 64 or 65 and by the adjacent piston rod 14 or 15, so that a pressure balance is maintained at opposite ends of the pilot valve 32 to hold the same positioned until the power piston 13 substantially reaches its limit of movement in the opposite direction.

With the above arrangement, the rate of reciprocatory movement of the power piston 13 is controlled by the rate of flow of hydraulic fluid through the inlet port 47, the power applied by the piston 13 to the movable parts to which it is attached being dependent upon the pressure of the fluid introduced through the inlet port 47.

Our reciprocatory motor is particularly adapted for use in driving the cutter bars of sickle bar mowers and the like, as well as tamping and drilling devices, but is as readily adapted for use with various other reciprocating mechanisms. While we have shown and described a commercial embodiment of our reciprocatory motor, it will be understood that the same is capable of modification, and that modification may be made without departure from the spirit and scope of the invention, as defined in the claims.

What we claim is:

1. In a fluid pressure operated reciprocatory motor,
   (a) structure including body means defining a power cylinder and reversing and pilot valve cylinders and axial position rod receiving bores at opposite ends of said power cylinder,
(b) a power piston axially movable in said power cylinder and having aligned piston rods in said bores for common movements with said piston,
(c) said structure having an inlet port for connection to a source of fluid pressure and an outlet port and passage means connecting said inlet and outlet port with said valve cylinders and connecting said reversing valve cylinder with said power cylinder,
(d) a pilot valve and a reversing valve axially movable in respective ones of said valve cylinders,
(e) said pilot valve having axially spaced valve pistons and intervening circumferential grooves for controlling flow of fluid to and from said reversing valve cylinder,
(f) said reversing valve having axially spaced valve pistons and intervening circumferential grooves for controlling flow of fluid to and from said power cylinder,
(g) said structure further having a pair of fluid passages each extending from a different one of said bores axially outwardly of the adjacent end of said power cylinder to a different end of said pilot valve cylinder, said fluid passages being disposed to maintain a pressure balance at opposite ends of said pilot valve cylinder during movement of said power piston between opposite ends of said power cylinder,
(h) and a pair of check valves one each connecting one of said fluid passages to the adjacent end of said power cylinder,
(i) said piston rods each defining passage means connecting one end of said power cylinder with the adjacent one of said fluid passages responsive to movement of said power piston toward the adjacent end of said power cylinder, said last mentioned passage means each cooperating with a different one of said fluid passages and one of the passage means connecting said reversing valve cylinder and said power cylinder to provide a passage connection to said outlet port.

2. A motor as defined in claim 1 in which said valves each include an axially central valve piston of relatively short axial length and an axially relatively long valve piston adjacent each end thereof, said grooves each having an axial length substantially equal to the length of said relatively long valve pistons.

3. A motor as defined in claim 1 in which,
(a) said body means comprises an upper body section, and intermediate body section, a lower body section and opposed end sections overlying the opposite ends of said body sections,
(b) said lower body section defining said power cylinder,
(c) said end sections defining said bores,
(d) said intermediate section being bored to define said valve cylinders.

4. A motor as defined in claim 1 in which said first mentioned passage means comprises,
(a) inlet passages extending from said inlet port to said valve cylinders generally centrally between the ends of said valve cylinders,
(b) outlet passages extending from said outlet port to said valve cylinders intermediate said inlet passages and opposite ends of said valve cylinders,
(c) control passages extending from opposite ends of said reversing valve cylinder to said pilot valve cylinder intermediate the inlet passage thereto and the outlet passages thereto,
(d) and transfer passages extending from the opposite ends of said power cylinder to said reversing valve cylinder and communicating therewith intermediate the inlet passage thereto and said outlet passages associated therewith.

References Cited in the file of this patent
UNITED STATES PATENTS

| | | |
|---|---|---|
| 552,081 | Williams | Dec. 24, 1895 |
| 1,952,690 | Strom | Mar. 27, 1934 |
| 2,204,000 | Pierce | June 11, 1940 |
| 2,688,314 | Holm et al. | Sept. 5, 1954 |
| 2,799,444 | Schemmel | July 16, 1957 |
| 2,812,055 | Wenger | Nov. 5, 1957 |
| 2,932,175 | May | Apr. 12, 1960 |